United States Patent [19]
Ohlmann et al.

[11] Patent Number: 6,073,883
[45] Date of Patent: Jun. 13, 2000

[54] AIRCRAFT OVERHEAD REST AREAS

[75] Inventors: Kim G. Ohlmann, Snohomish; Mark E. Wentland, Lynnwood; Richard C. Burnham, Bothell; Mithra M. K. V. Sankrithi, Seattle; Richard J. Mazzone, Snohomish, all of Wash.

[73] Assignee: The Boeing Company, Seattle, Wash.

[21] Appl. No.: 09/144,407

[22] Filed: Aug. 31, 1998

Related U.S. Application Data

[60] Provisional application No. 60/058,332, Sep. 10, 1997, provisional application No. 60/058,344, Sep. 10, 1997, provisional application No. 60/058,345, Sep. 10, 1997, and provisional application No. 60/058,485, Sep. 10, 1997.

[51] Int. Cl.[7] .................................................. B64D 11/00
[52] U.S. Cl. .................................. 244/118.5; 244/118.6; 5/118; 105/344; 105/345; 105/316
[58] Field of Search .............................. 244/118.5, 118.6; 5/118; 105/314, 315, 316, 344, 345

[56] References Cited

U.S. PATENT DOCUMENTS

| | | | |
|---|---|---|---|
| 2,081,529 | 5/1937 | Canney | 244/118.6 |
| 4,854,245 | 8/1989 | Platzer | 105/317 |
| 5,697,580 | 12/1997 | Reinhardt | 244/118.5 |
| 5,752,673 | 5/1998 | Schliwa et al. | 244/118.6 |
| 5,784,836 | 7/1998 | Ehrick | 52/79.8 |

FOREIGN PATENT DOCUMENTS 2169256  7/1986  United Kingdom.

*Primary Examiner*—Michael J. Carone
*Assistant Examiner*—James S. Bergin
*Attorney, Agent, or Firm*—Christensen O'Connor Johnson & Kindness PLLC

[57] ABSTRACT

A rest area is provided in the crown of an aircraft, above the ceiling of the main passenger cabin. The rest area includes a longitudinally extending aisle having a floor lowered into the overhead bin structure of the passenger cabin, and raised beds accessible from the aisle. The beds can extend longitudinally at opposite sides of the aisle, or transversely of the aircraft with end access from the aisle. The rest area can incorporate a lounge consisting of a couch, recliners, and/or storage units, with an enlarged passing area for users of the rest area. The overhead rest area provides a convenient, comfortable resting area, such as for pilots and attendants, without affecting the revenue generating capability of the seating configuration of the main passenger cabin, or the cargo carrying capably of the lower lobe of the aircraft.

29 Claims, 17 Drawing Sheets

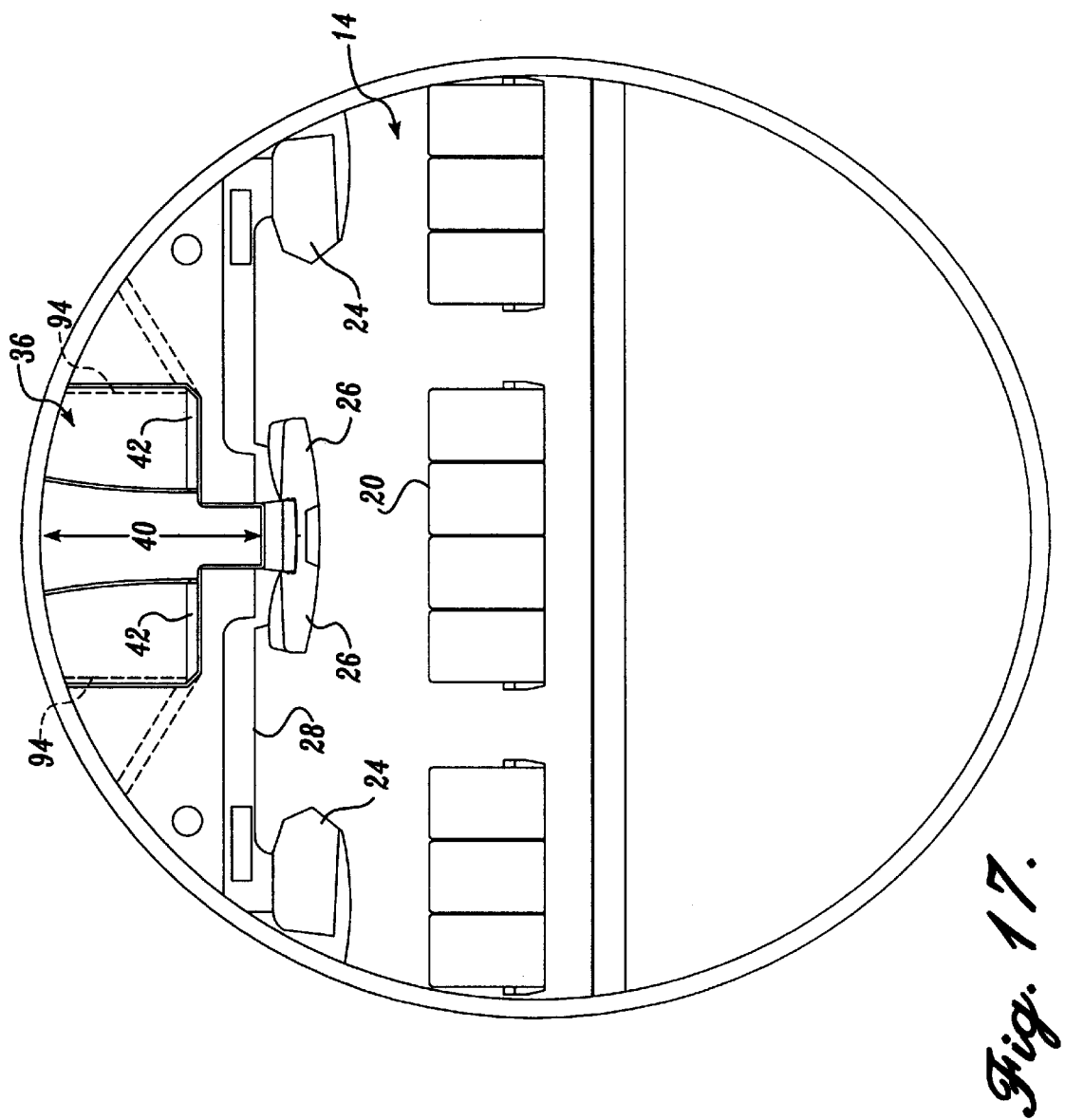

AIRCRAFT OVERHEAD REST AREAS

This application claims the benefit of the following U.S. provisional applications, each of which was filed on Sep. 10, 1997: Ser. No. 60/058,332; Ser. No. 60/058,344; Ser. No. 60/058,345; and Ser. No. 60/058,485.

FIELD OF THE INVENTION

The present invention relates to sleeping compartments or other rest areas for commercial passenger aircraft, particularly for use by flight attendants and pilots during long non-stop flights.

BACKGROUND OF THE INVENTION

Modern commercial aircraft are designed for maximizing the dollar value of the payload, which can involve maximizing the passenger carrying capacity, taking into consideration passenger amenities which may command a premium fare.

For many passenger aircraft of circular or ovoid cross-section, the main cabin floor is disposed somewhat below the geometric center to provide a large passenger compartment having the usual ceiling, overhead storage compartments, and other amenities. Ducts, cables, safety equipment, etc., can run through the small "crown" at the top above the ceiling and overhead bins. The space below the cabin floor, substantially smaller than the cabin area itself, is designed for standardized cargo/baggage containers, as well as equipment bays, structural members, and auxiliary equipment. The area above the passenger cabin ceiling is even smaller. All in all, the goal is to provide a single, large, attractive passenger cabin with few encumbrances not directly associated with passenger comfort, such as galleys and lavatories.

Long range subsonic airliners may have non-stop flights of a duration of 12 hours or more. On such long flights, it is required by federal regulations to provide room for pilot rest areas and necessary to also provide attendant rest areas. For example, in the case of a Boeing 747, a small aft portion may be reserved for an upstairs bunkhouse, in an area aft of passenger seating, and it has been proposed to provide bunks in other non-seating areas, over or adjacent to other cabin monuments such as galley areas and/or areas adjacent to rear exit doors.

SUMMARY OF THE INVENTION

The present invention provides a rest area in the crown of an aircraft, such as an long range subsonic passenger airliner, above the ceiling of the passenger cabin. In the preferred embodiment, the rest area is provided in a wide body, dual aisle aircraft having starboard, center, and port seat groups. The rest area is centered over the center seat group, without dividing the passenger cabin longitudinally, but rather still providing adequate headroom above the center seat group. In the currently preferred embodiment, access to the overhead rest area is by way of a stairway in the aft portion of the aircraft, behind the last row of seating of the center seat group, adjacent to an aft galley. The stairway leads to a long, narrow aisle which permits transiting the enclosed space between longitudinally extending beds at either side. An additional forward stairway can be provided. To the extent that it is required to achieve adequate headroom in the aisle, the overhead bin structure above the center seat group of the main passenger cabin is lowered relative to a conventional design. Should sufficient headroom exist for the insertion of a long narrow aisleway between bunks, the internal space captive within the overhead bin envelope is utilized. In these instances overhead bins still are available on opposite sides of the lower portion of the aisle. Emergency equipment and passenger amenities, such as ventilation outlets, reading lights, call buttons, etc. are still provided to the passenger area directly below the overhead rest area.

The stairway may open at the side or to the rear, and one or more beds may be deleted to provide a widened aisle or passing area to ease ingress and egress when multiple users are in the rest area. In one configuration, three side-by-side beds can be provided at the forward end of the overhead rest area.

The rest area may incorporate a lounge consisting of a settee, a couch, recliners, and one or more storage areas. The lounge, as well as the bunk or bed units, can be provided as modules, and the lounge can be located at any desired location along the length of the overhead rest area.

In another configuration, a center bed can be provided at the forward end of the overhead rest area, staggered relative to beds at opposite sides. The forward portion of the center bed can lead to equipment storage bins, such as for electronic equipment or power supplies associated with video displays or other passenger amenities for the main cabin.

While a central aisle is currently preferred, the aisle of the overhead rest area can be offset relative to the centerline of the aircraft, in which case beds may be arranged along only one side of the aisle, and the overhead storage bins removed from the side having the aisle, while larger bins are provided at the other side. Another alternative is to provide transversely extending beds in conjunction with an offset aisle, or beds extending longitudinally along one side of the aisle and transversely along the other side of the aisle.

Regardless of the configuration, ducts and structural members normally located in the central portion of the crown of the aircraft are relocated outboard and, preferably, the rest area directly overlies passenger seating without a substantial effect on the number of seats in the main cabin and, therefore, without affecting the revenue generating capability of the seating configuration.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 17 is a diagrammatic section of an aircraft of ovoid cross-section, such as a vertical Boeing 747, and illustrates the location of an overhead crew rest area without lowered center stowbins.

DETAILED DESCRIPTION OF THE PREFERRED EMBODIMENT

Figure 1:
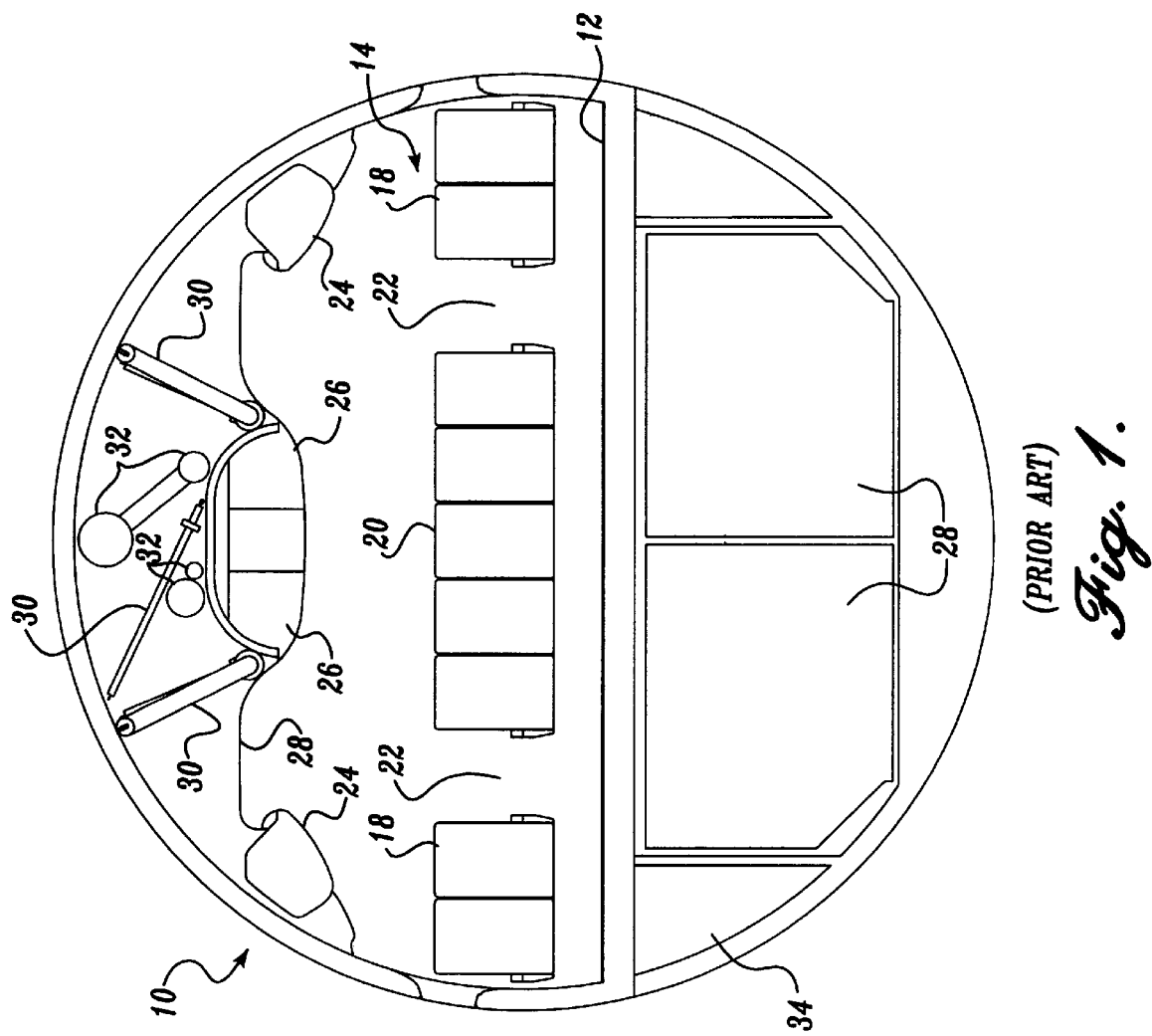
FIG. 1 (prior art) is a diagrammatic cross-section of an aircraft of the type with which the present invention is intended to be used, such as a Boeing 777.

FIG. 1 shows a diagrammatic cross-section of an aircraft of the type with which the overhead attendant rest area in accordance with the present invention is intended to be used, in this case a Boeing 777. For most of its length, the aircraft 10 is of circular cross-section, a semimonocoque design having an outer skin supported on an inner peripheral frame. The floor 12 of the main cabin is disposed somewhat below the geometric center to provide a large passenger compartment 14 having the usual seating. For a wide body aircraft, typically the seating will include two outboard seat groups 18 and a center seat group 20, with aisles 22 between the outboard groups and the center group. While a 2-5-2 configuration of seating is shown, other configurations are possible, such as a 3-3-3 configuration, with reference to the number of seats in each group. Most often, however, the most efficient layout for a wide body aircraft having dual aisles necessitates the provision of a center seat group 20 along the centerline of the aircraft.

The large passenger compartment 14 has outboard overhead storage compartments 24 (primarily for carry-ons), inboard storage compartments 26, and other amenities. The ceiling 28, storage bins 24 and 26, and any other ceiling mounted amenities or equipment are supported by an arrangement of structural ties 30 which are mounted in the crown of the aircraft, i.e., the area above the ceiling 28 of the passenger compartment, along with air-conditioning ducts 32. Typically, the lower lobe 34 of the aircraft accommodates standard cargo/baggage containers 28, as well as equipment bays, structural members and auxiliary equipment.

Figure 2:
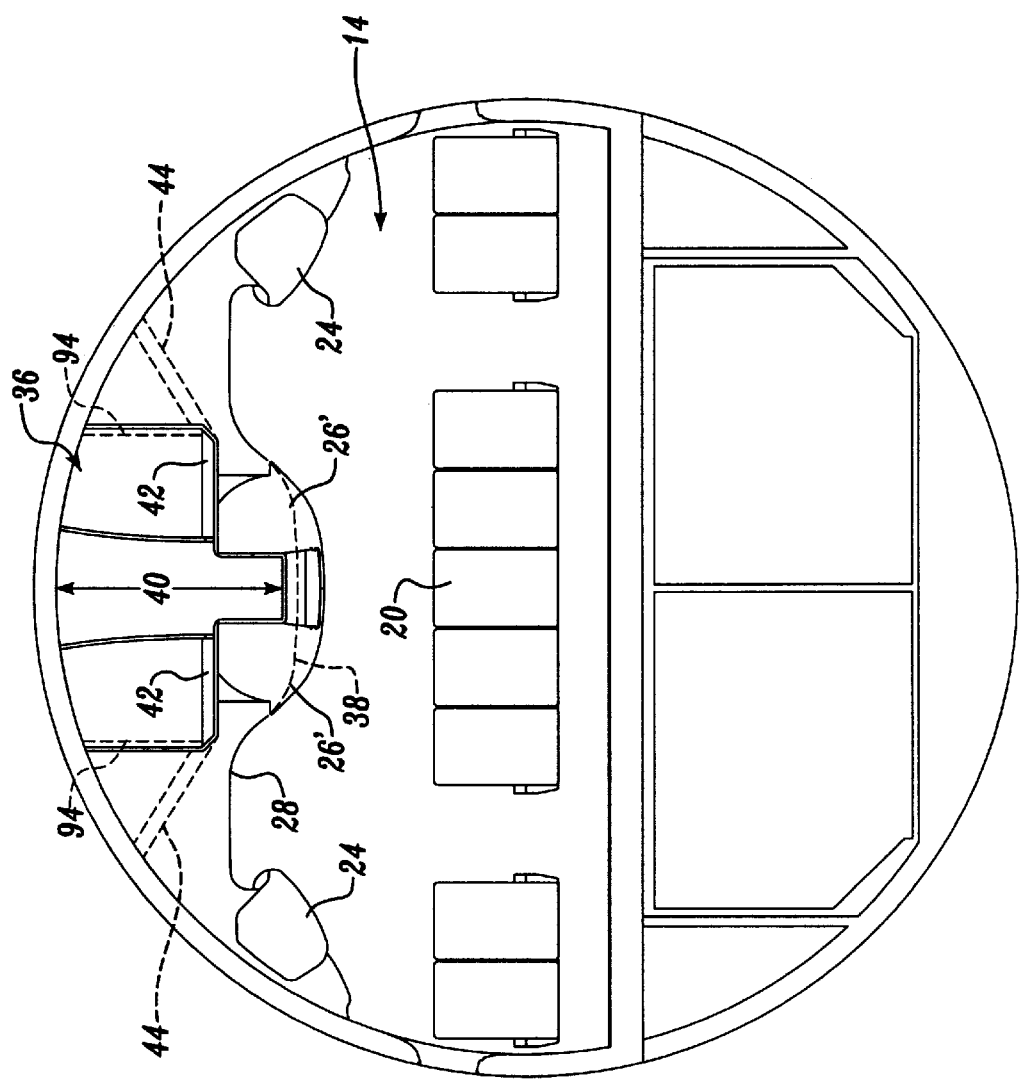
FIG. 2 is a diagrammatic cross-section corresponding to FIG. 1, illustrating the location of an overhead rest area in accordance with the present invention.

With reference to FIG. 2, in accordance with the present invention, an overhead rest area 36 is provided in the crown of the aircraft, above the ceiling 28 of the passenger cabin 14. The broken line 38 represents the contour of the central portion of the ceiling and overhead bin structure of the conventional aircraft shown in FIG. 1. In accordance with the present invention, the ceiling is lowered at the center, such that there is room for a narrow aisle 40 with increased headroom. The rest area preferably includes bunks or beds 42 at opposite sides of the aisle which extends along the centerline of the aircraft. While the design does not affect the location or sizing of the outboard overhead bins 24, modified inboard overhead bins 26' of reduced size are located at opposite sides, respectively, of the lower portion of the aisle 40. The tapering of the ceiling down toward the center still allows sufficient headroom for passengers occupying the center seat group 20, and for ingress thereto and egress therefrom. The air-conditioning ducts and structural members that normally would occupy the central portion of the room must be relocated outboard or be integrated between bunks such that bunk spaces have no interferences. For example, the main structural support for the rest area can be by ties 44 angled outward from the rest area to the aircraft frame.

Figure 3:
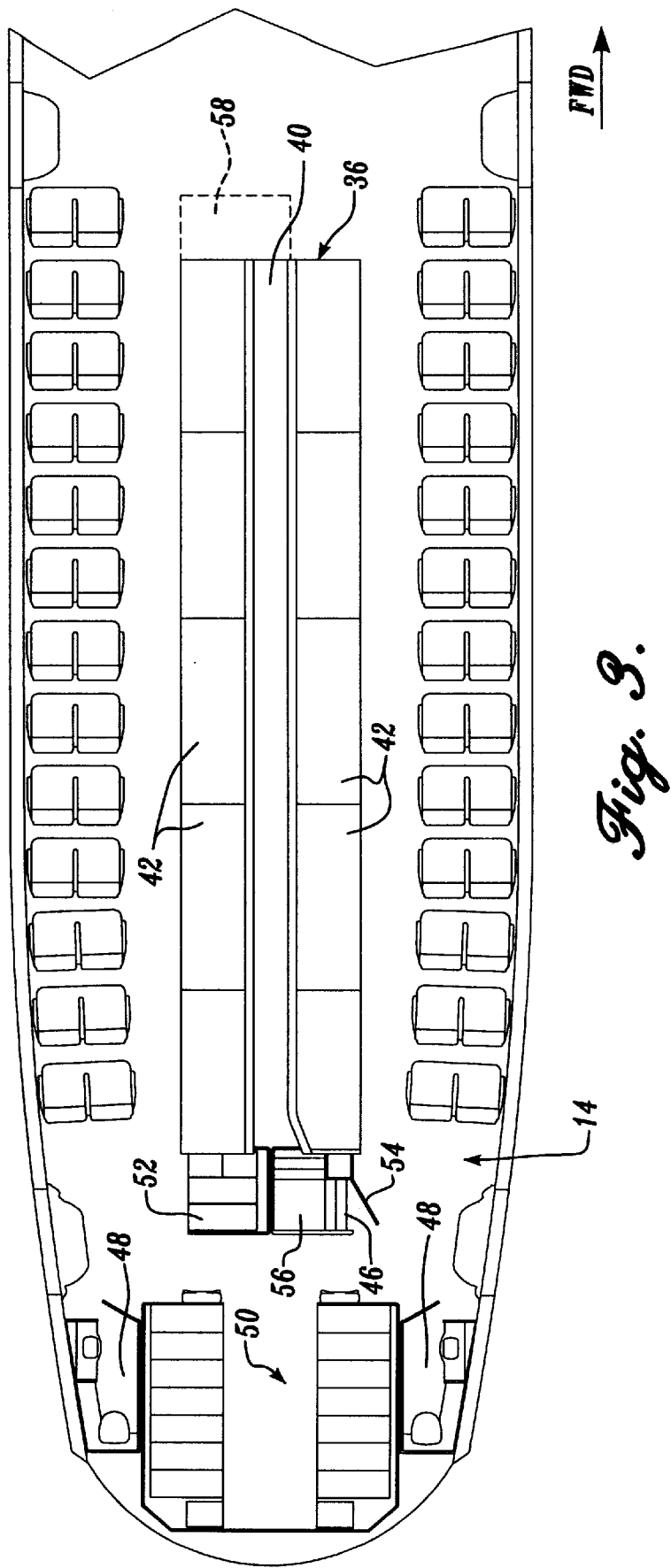
FIG. 3 is a diagrammatic top plan of the aft portion of the aircraft of FIG. 2, illustrating the layout of bunks or beds in the overhead rest area.
Figure 4:
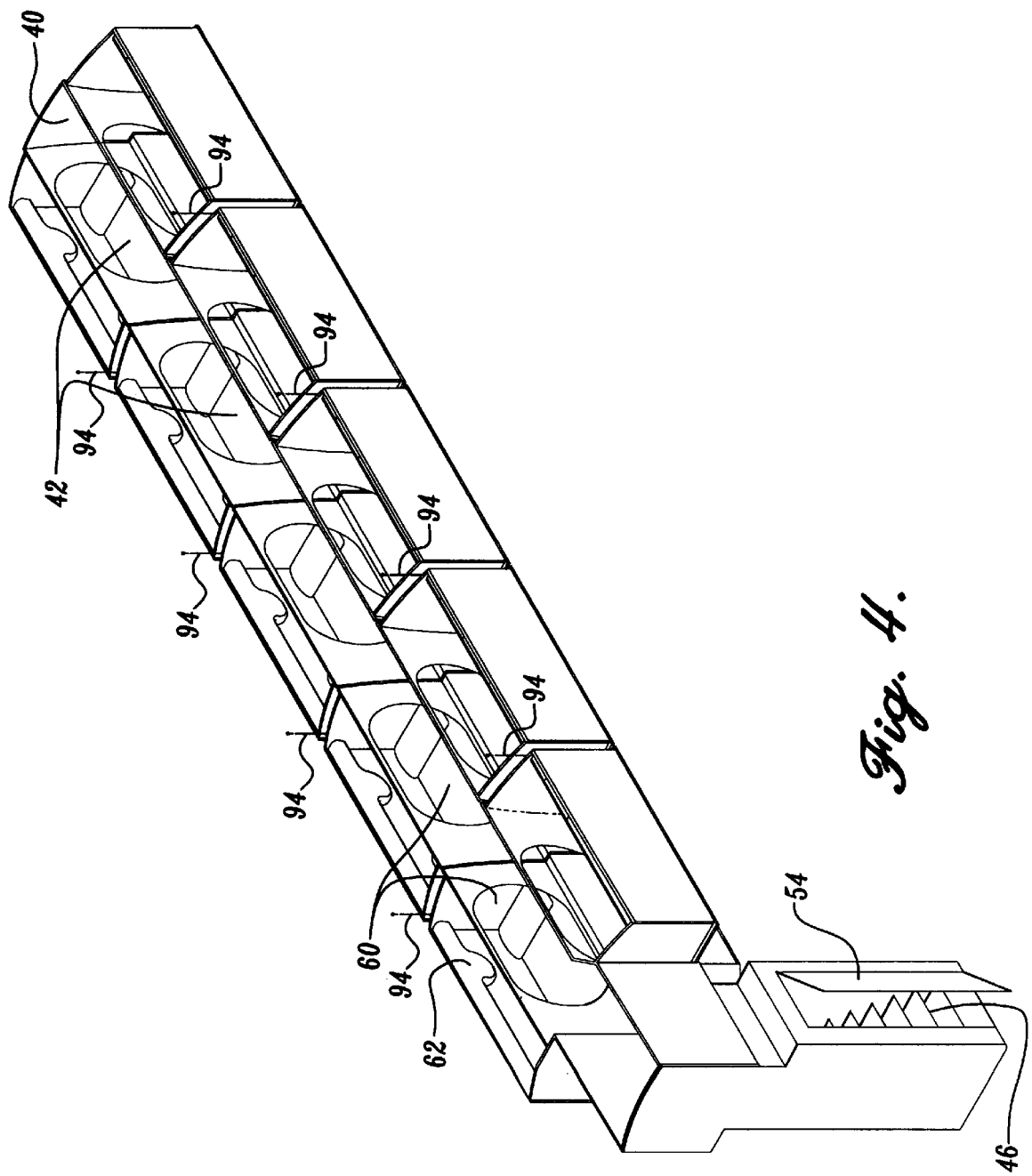
FIG. 4 is a diagrammatic top perspective of an overhead rest area in accordance with FIG. 3.

With reference to FIG. 3, access to the overhead rest area 36 can be by way of a stairway 46 in the aft portion of the aircraft, behind the last row of seating in the main passenger cabin 14, adjacent to the lavatories 48 and rear galley area 50, for example. The exact location of the stairway will depend on the location of permanent structure or monuments in the aircraft, such as the monument shown as the existing equipment bay 52. Thus, if a monument is designed for the starboard side of the aircraft, the stairway will be located on the port side, rather than on the starboard side as shown. It is preferred that a secure door 54 be provided for the stairway so that unauthorized personnel do not have access. For safety purposes, the stairway can include a center landing 56 with lower stairs leading transversely to the landing, and an upper set of stairs leading from the landing to the aisle 40 between the beds 42. An additional stairway 58 can be provided at the forward portion of the overhead rest area. With reference to FIG. 4, large side openings 60 provide convenient access to the beds 42, and privacy curtains can be provided for such openings. The layout lends itself to providing individual amenity modules 62 for the separate beds, which can include individually controlled lighting and ventilation nozzles, as well as communication equipment, and audio or visual alarms or call indicators. The layout provides regularly spaced intervals between individual bed modules for angled support members 44 (FIG. 2) and/or vertical support members 94 (FIG. 4) that coincide with regularly spaced intervals between sets of fuselage frames.

Figure 5:
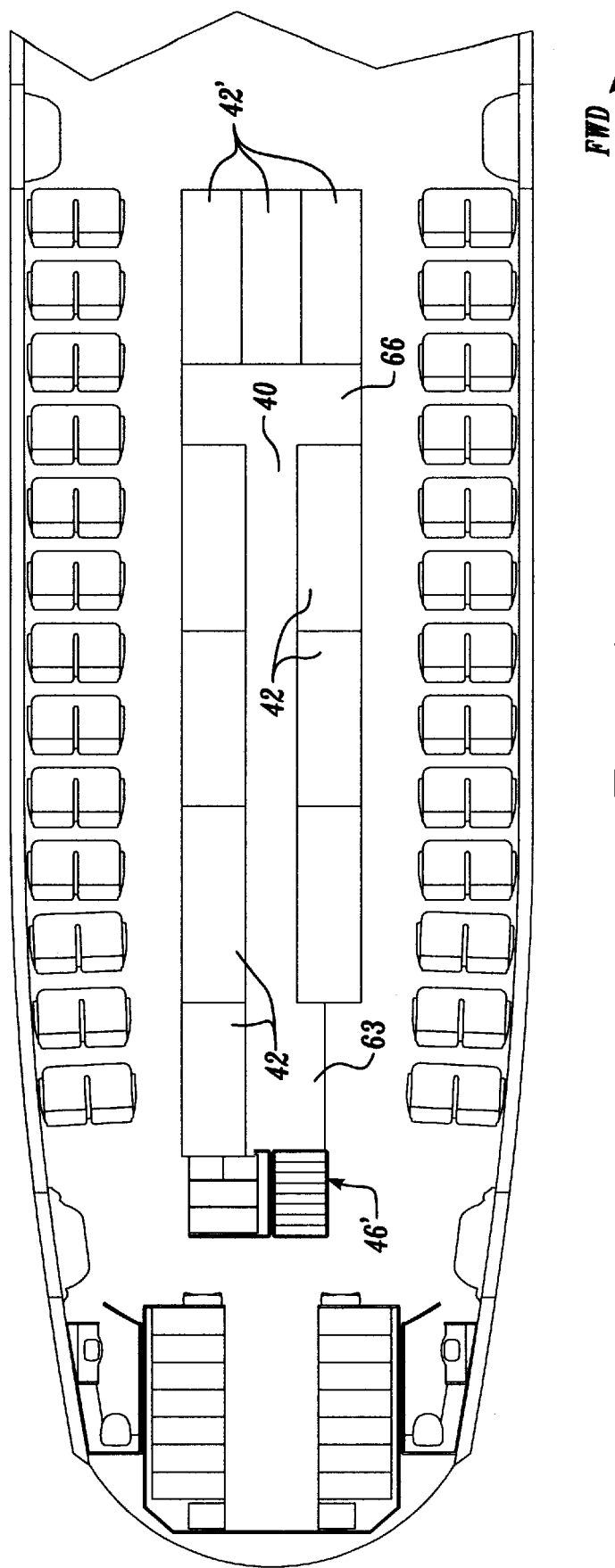
FIG. 5 is a diagrammatic top plan of the aft portion of an aircraft, corresponding to FIG. 3, but illustrating an alternative layout of beds in an overhead rest area in accordance with the present invention.

In the alternative layout shown in FIG. 5, the aft stairway 46' extends solely longitudinally of the aircraft. The starboard aft bed is removed, providing a widened passing area 63 in the aft portion of the longitudinally extending aisle 40. This may necessitate removing or at least decreasing the size of the overhead bin(s) in this area. A cross aisle 66 is provided toward the front of the modified rest area, with three side-by-side beds 42' located forward of the cross aisle. These beds necessarily have only end access, which is not as convenient as the side access provided for the side beds 42.

Figure 6:
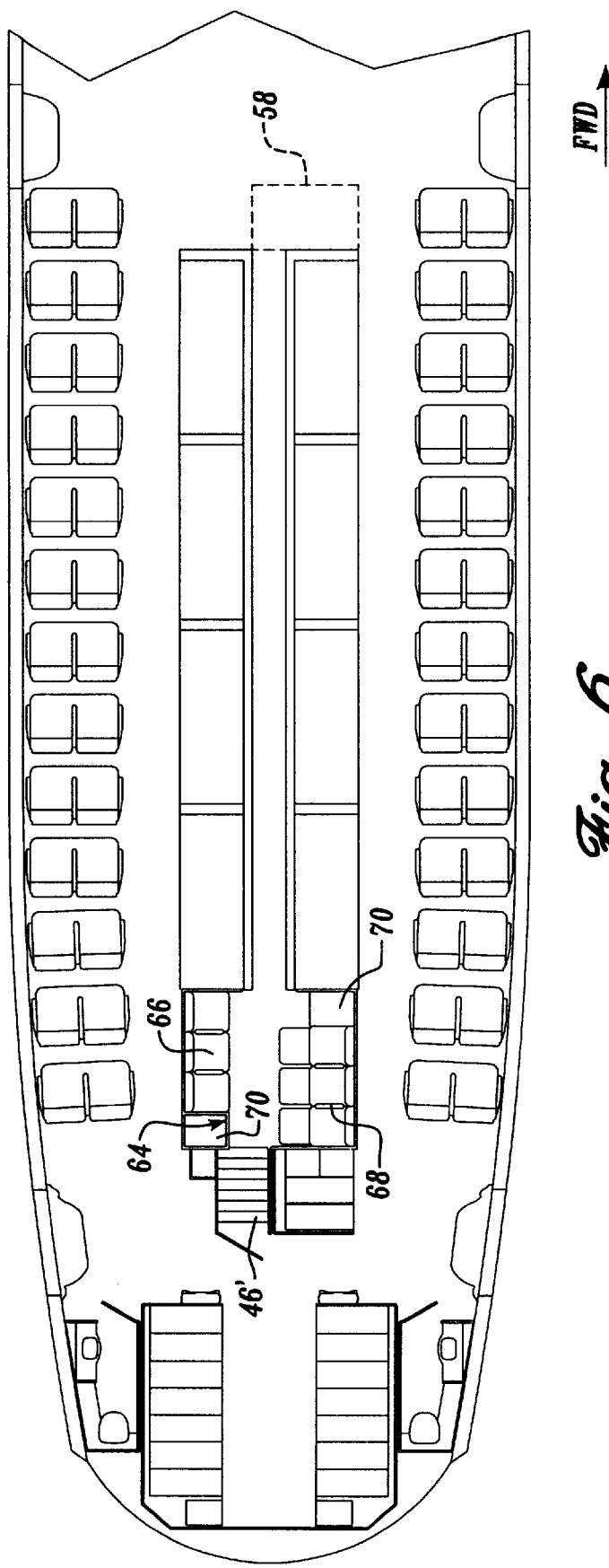
FIG. 6 is a diagrammatic top plan of an overhead rest area in accordance with the present invention incorporating a lounge module.
Figure 7:
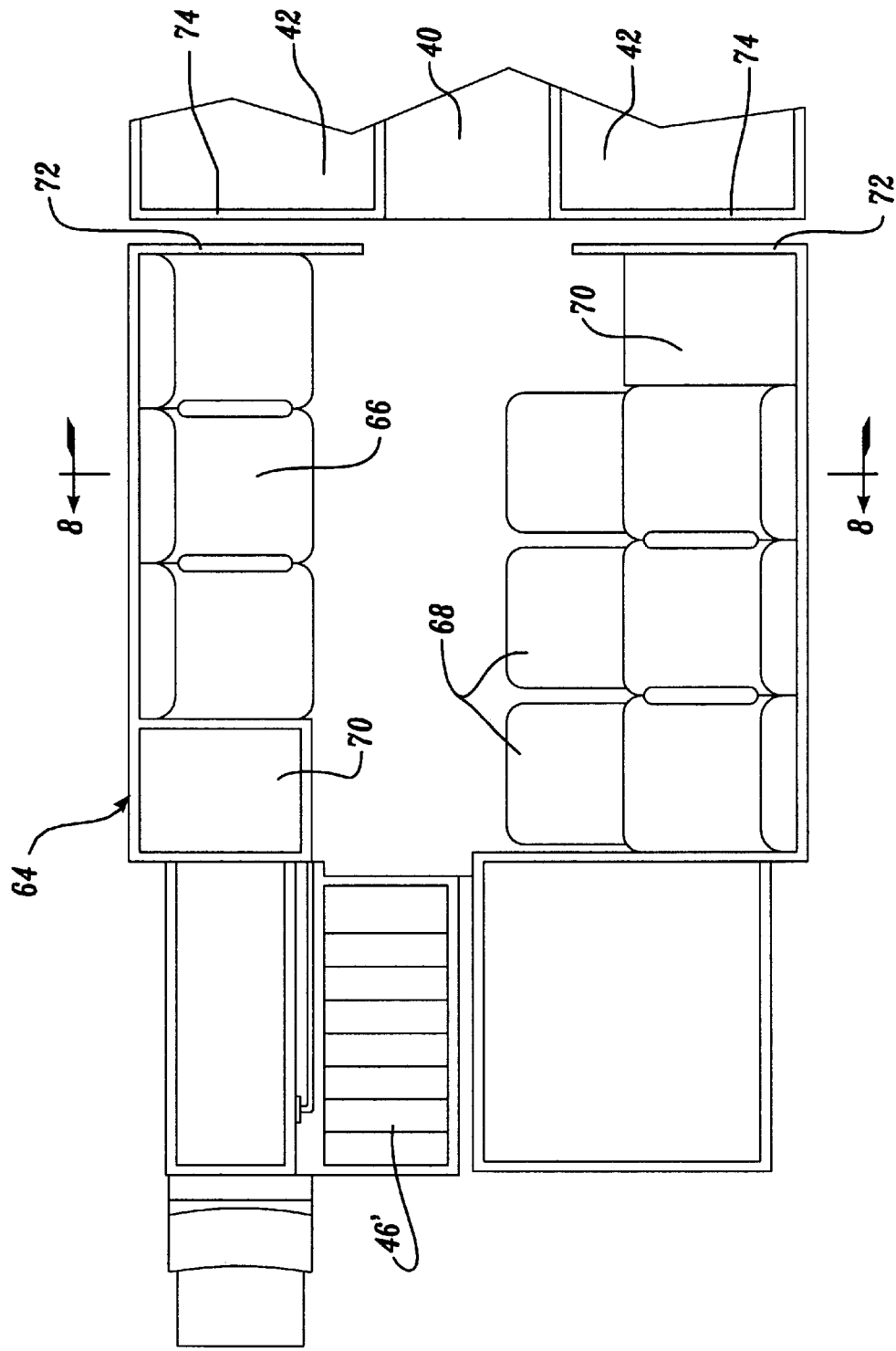
FIG. 7 is an enlarged diagrammatic top plan of the lounge module of FIG. 6.
Figure 8:
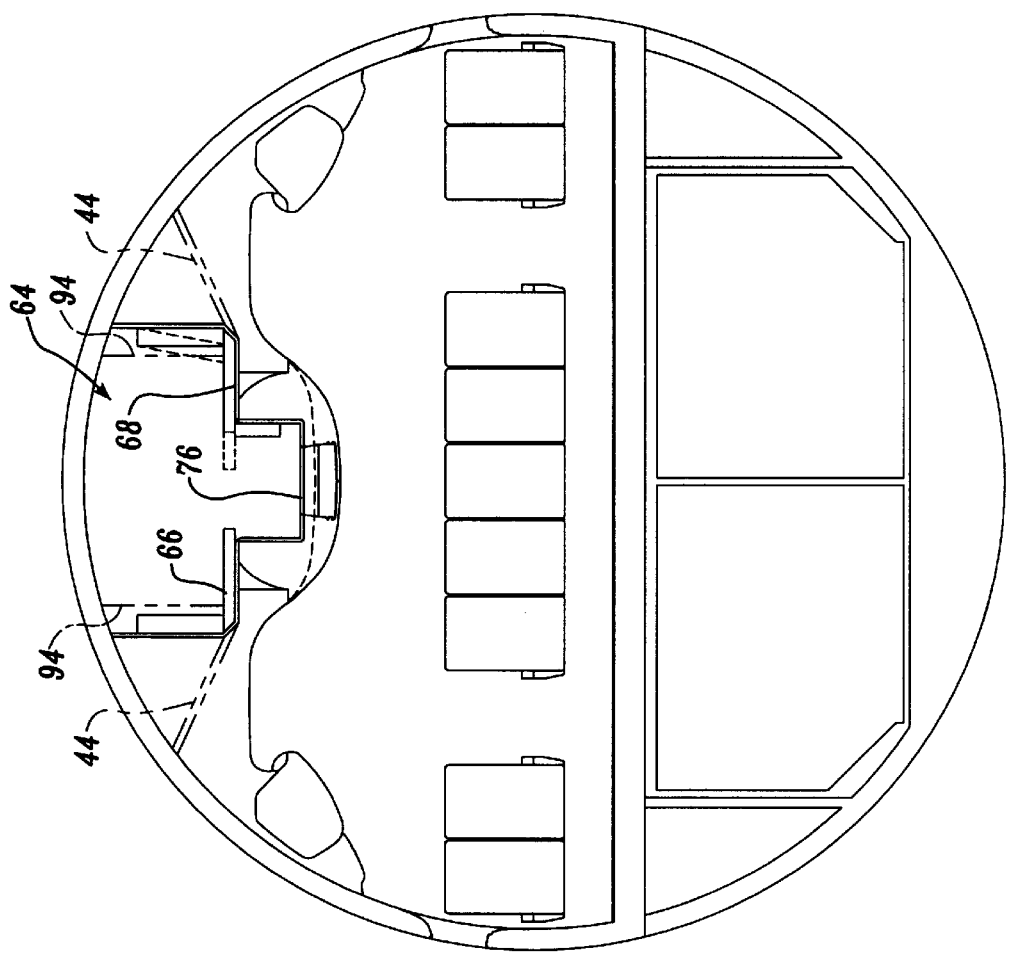
FIG. 8 is a diagrammatic section along line 8—8 of FIG. 7.
Figure 9:
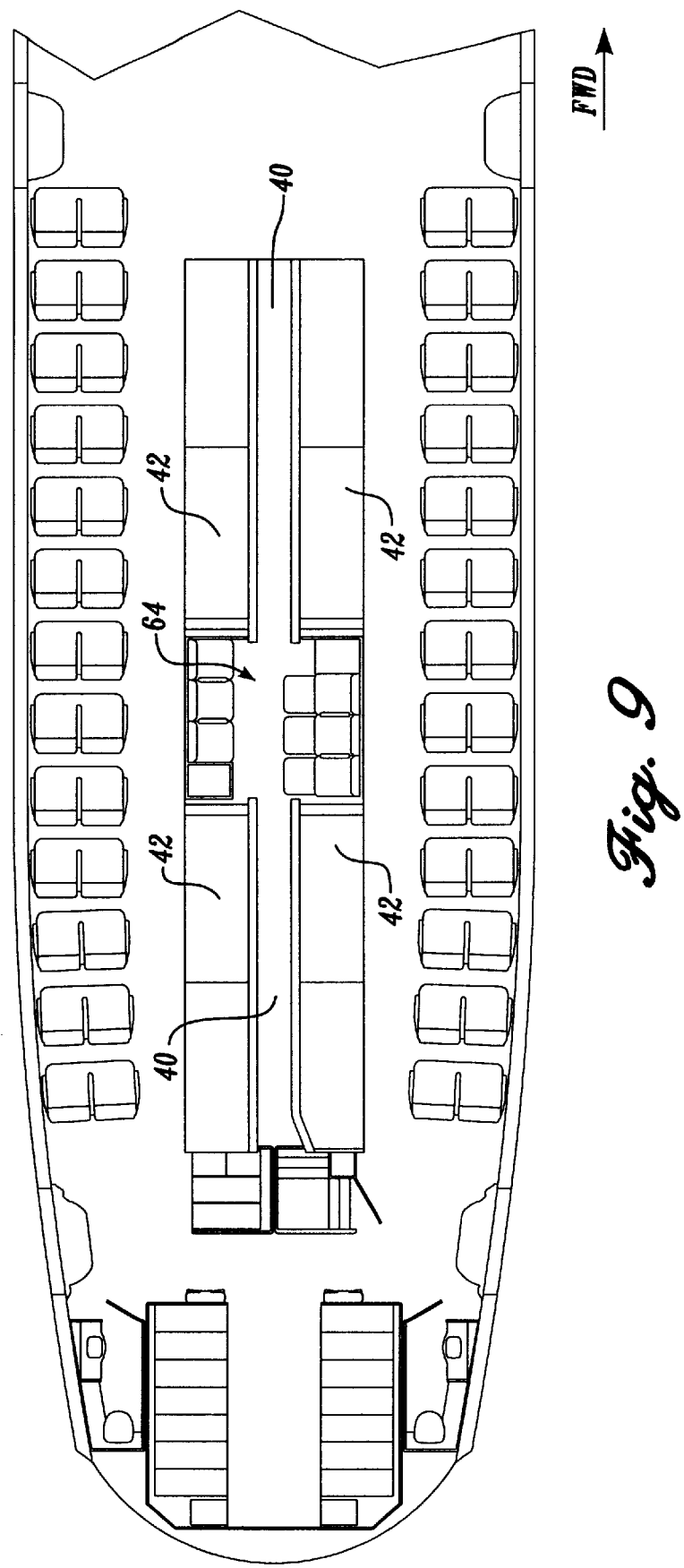
FIG. 9 is a diagrammatic top plan of the aft portion of an aircraft illustrating an alternative location for a lounge module.
Figure 10:
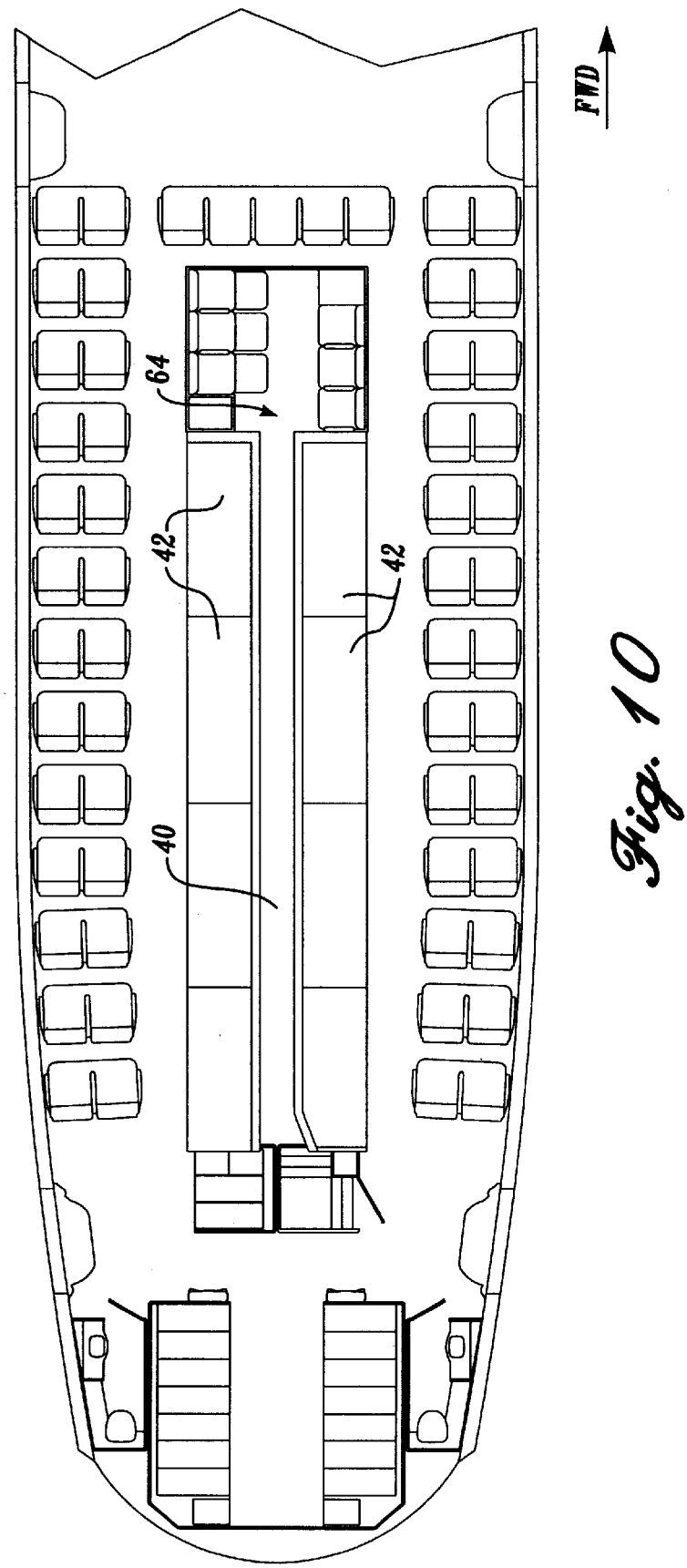
FIG. 10 is a diagrammatic top plan of the aft portion of an aircraft illustrating another alternative location for a lounge module.

The overhead rest area can be provided in modules so that additional sets or fewer sets of beds may be incorporated in a particular aircraft. For example, one module can consist of a section equal to the length of a bed. The end walls of the bed units can be secured together during installation. These modules systematically incorporate the necessary structural and system interfaces allowing additional or fewer sets of beds. The modular feature of the overhead rest area system in accordance with the present invention also lends itself to provision of other types of modules, such as a lounge module 64 as illustrated in FIGS. 6 and 7. FIG. 6 shows a stairway 46' mounted in the aft area of the aircraft at the port side, rather than to starboard, and the lounge module 64 is the first module reached by way of the stairway. A settee or couch 66 can be provided along one side of the module, with special comfort seating 68 at the other side, such as recliners. The increased floor area also allows users of the overhead rest area to pass by each other, and the lounge module can include closets or other storage units 70. The modular nature of the lounge module is best seen in FIG. 7, where the forward walls 72 are shown spaced rearward from the adjacent walls 74 of the next most forward module having a center aisle 40 and beds 42 at the sides. With reference to FIG. 8, the increased transverse dimension of the lounge floor 76 will necessitate changes in the configuration of the inboard overhead bins. The lounge area provides a comfortable location for resting and talking while sitting, without using revenue producing seats in the main cabin of the aircraft. The lounge area can be provided in the aft portion of the overhead resting area as shown in FIG. 6 as shown in FIG. 9, or toward the center, or at the forward portion of the resting area as shown in FIG. 10. The center location of FIG. 9 probably provides the most convenient passing location.

Figure 11:
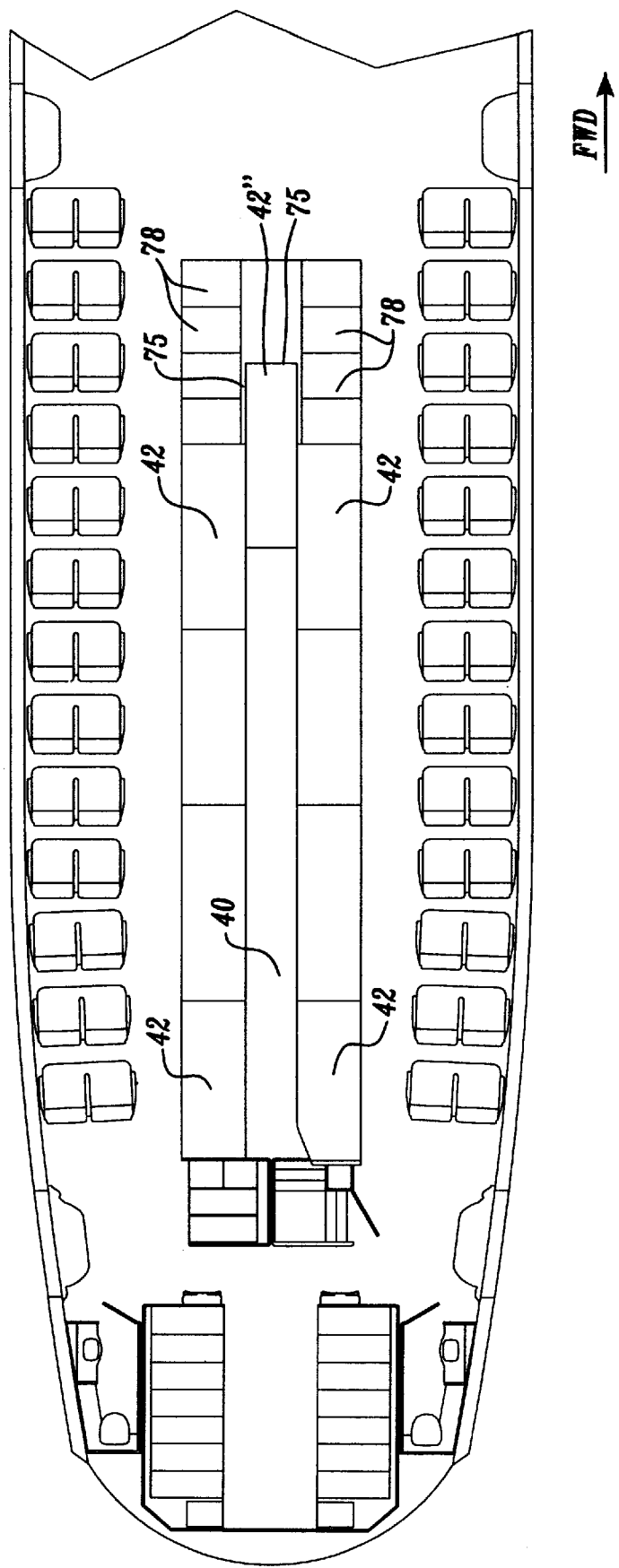
FIG. 11 is a diagrammatic top plan of the aft portion of an aircraft having an alternative layout for an overhead rest area in accordance with the present invention.

In the configuration illustrated in FIG. 11, each of the three aft modules consist of beds 42 at opposite sides of the center aisle 40. The next most forward module also has beds 42 at the opposite sides, but another bed 42" is fitted between the forwardmost side beds 42, and shifted forward relative to those beds. Doors or removable walls 75 separate the center forward bed 42" from another modular area which can include storage bins 78 for power supplies, video projection units or other equipment.

Figure 12:
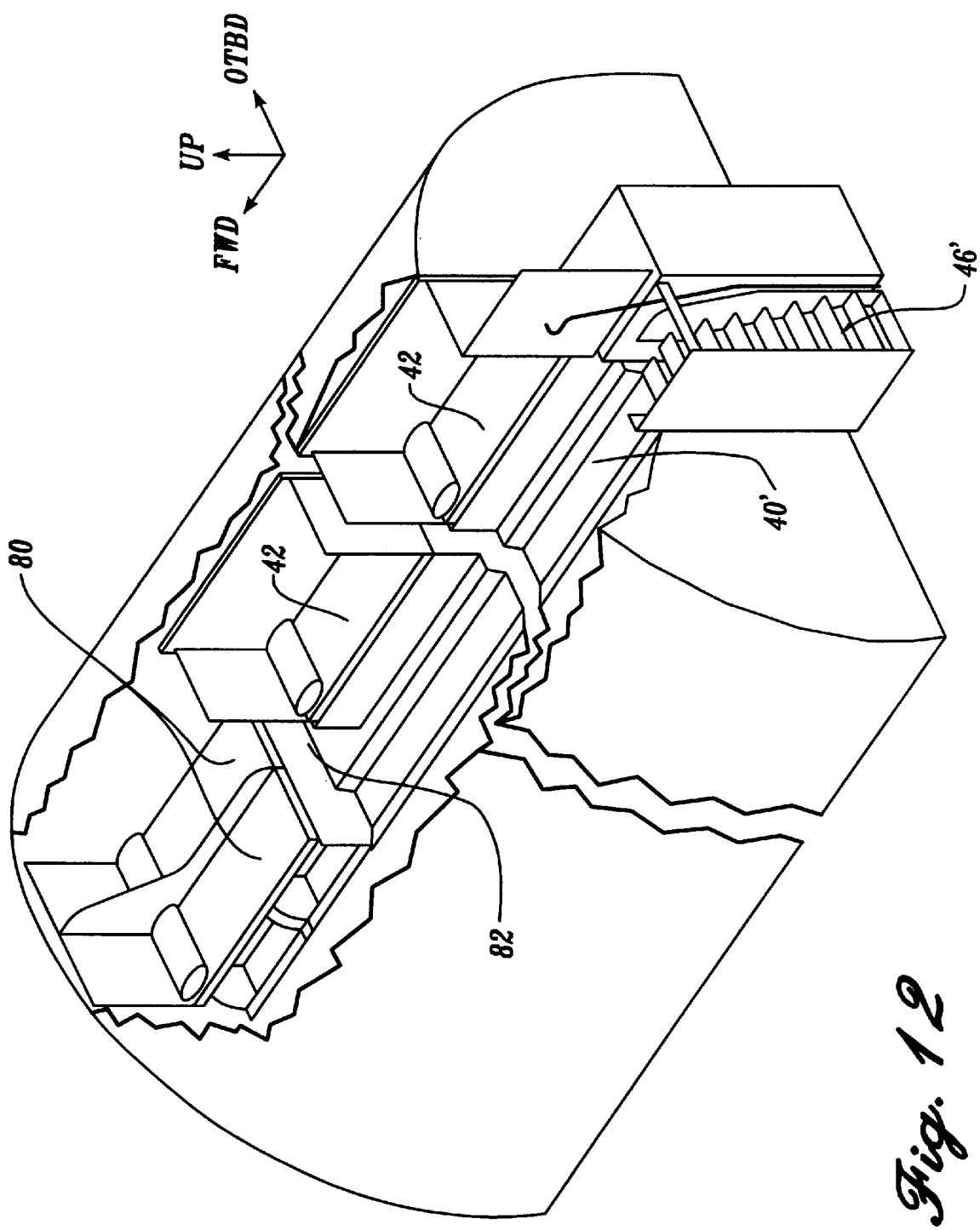
FIG. 12 is a diagrammatic top rear perspective of an alternative embodiment of an overhead rest area in accordance with the present invention, having an offset aisle.
Figure 13:
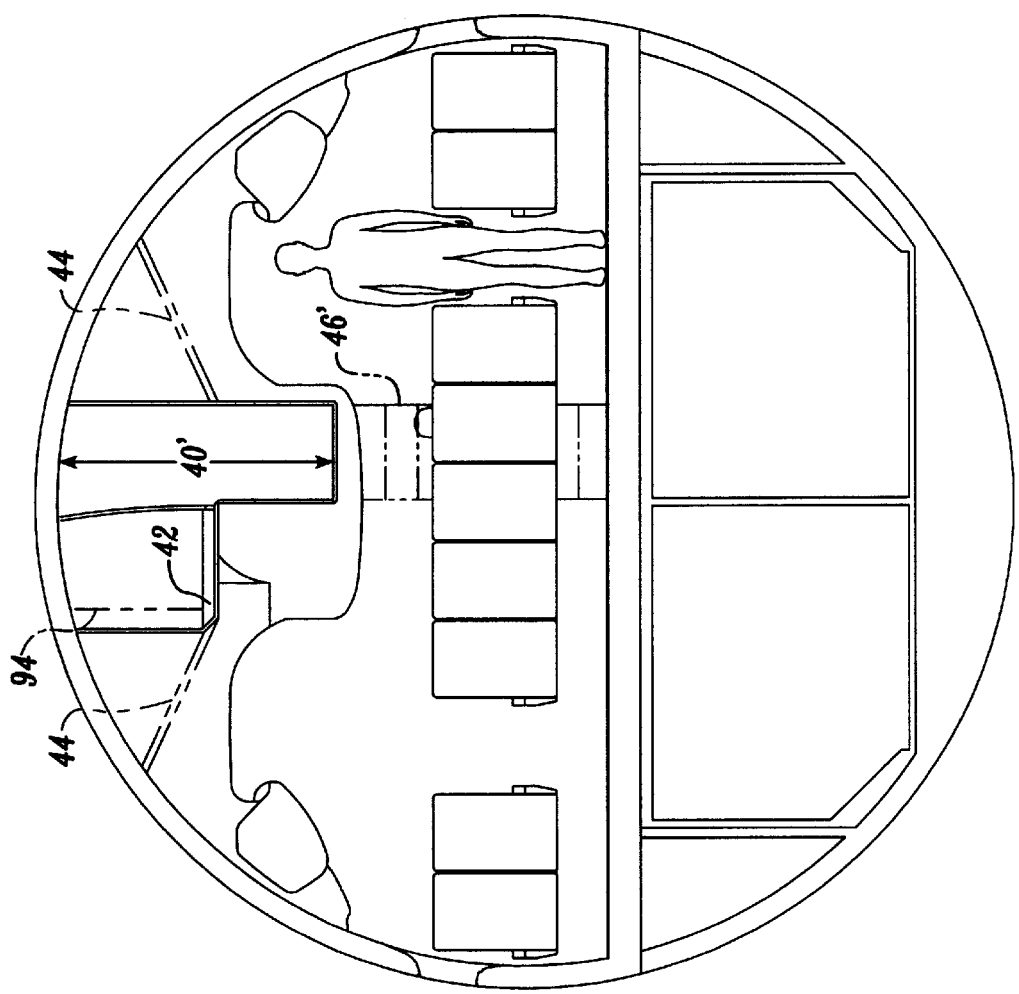
FIG. 13 is a diagrammatic transverse section of an aircraft having an overhead rest area in accordance with FIG. 12.

As noted above, a configuration which provides a center aisle is preferred, since the lowered area will be located toward the center of the aircraft where it is less obtrusive to passengers in the main cabin, and there still is the possibility of providing overhead storage bins at opposite sides of the lower portion of the aisle. Nevertheless, with reference to FIG. 12 and FIG. 13, an aisle offset toward one side of the aircraft may be provided, particularly if a smaller resting area with only a few beds is required. The overhead resting area shown in FIGS. 12 and 13 has a stairway 46' aligned with a lowered aisle 40' offset toward the port side of the aircraft, and with raised beds 42 along the starboard side of the aisle. At the leading end of the rest area, two additional side-by-side beds 80 are provided, the bed on the starboard side being accessible by a short raised cross aisle 82. As seen in FIG. 13, the lowered aisle 40', necessary to provide adequate headroom for moving through the rest area, forces the elimination of overhead bins from one side of the center unit of the main cabin, but a full-size overhead bin can be provided at the other side.

Figure 14:
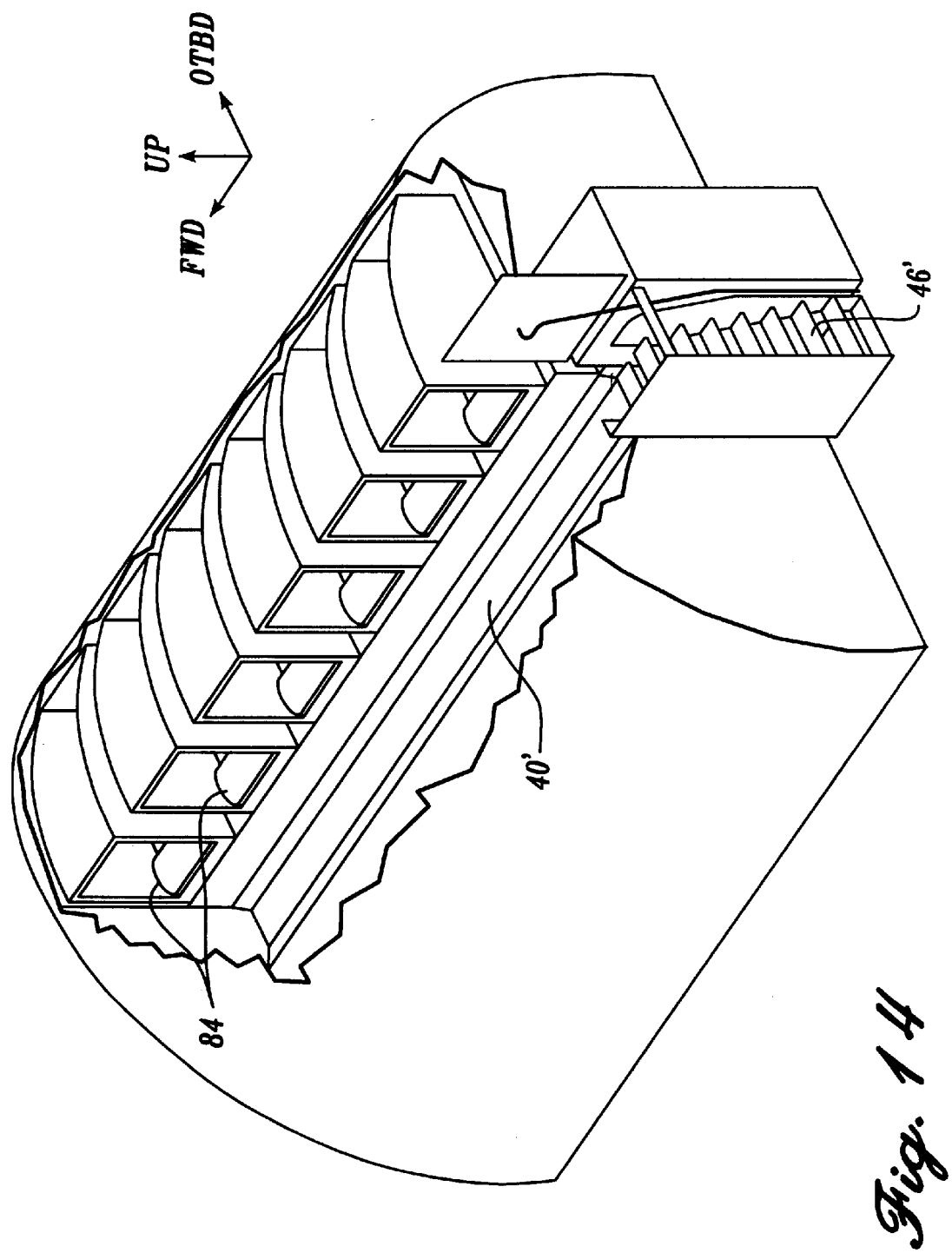
FIG. 14 is a diagrammatic top rear perspective of another alternative embodiment of an overhead rest area in accordance with the present invention.

With reference to FIG. 14, another possibility is to provide transversely extending modular beds 84 having ends opening at the offset aisle 40', but this arrangement is not preferred because end access to the beds is much less convenient than side access, and the transverse extent of the beds may interfere with routing of air-conditioning ducts or other necessary components.

Figure 15:
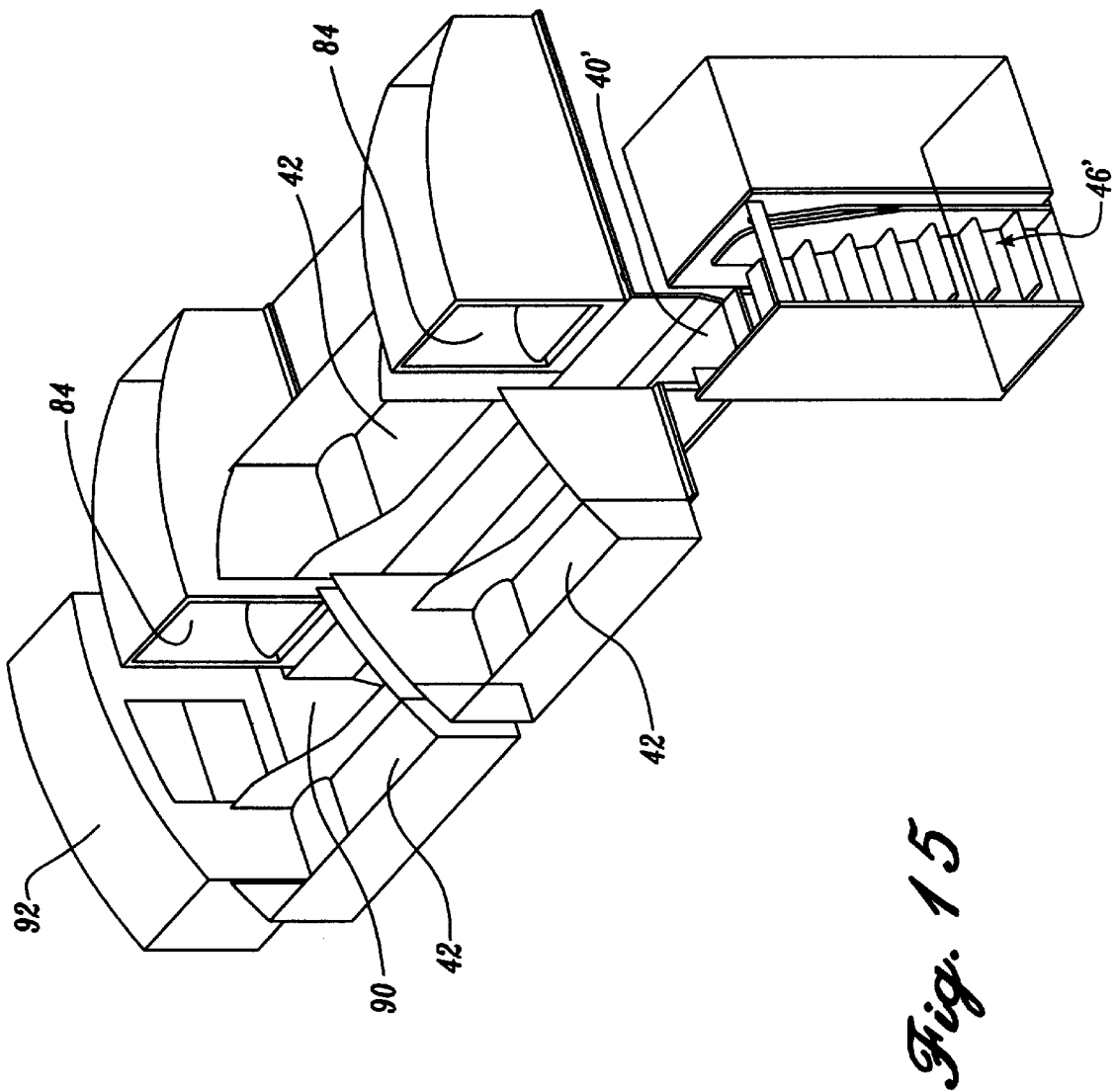
FIG. 15 is a diagrammatic top rear perspective of another alternative embodiment of an overhead rest area in accordance with the present invention.
Figure 16:
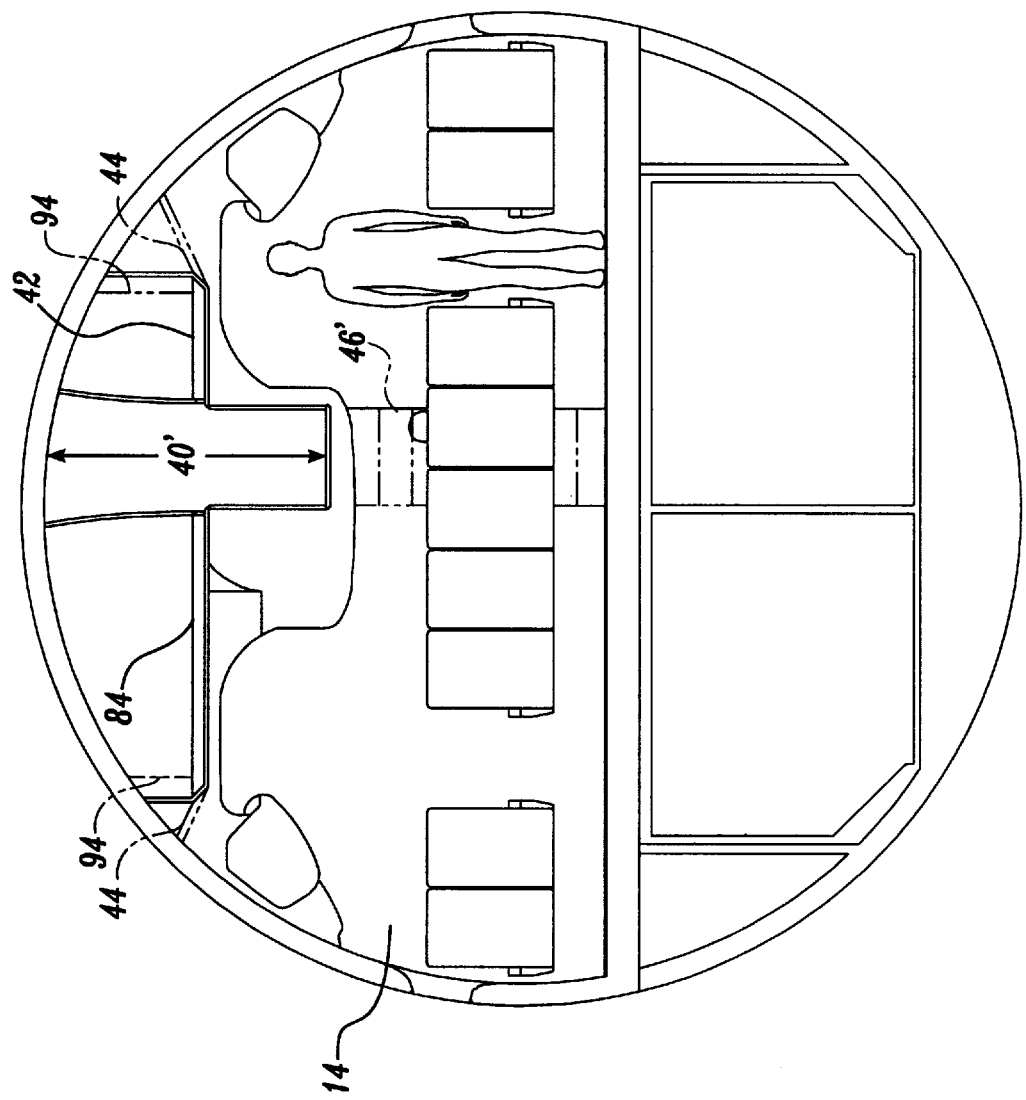
FIG. 16 is a diagrammatic vertical section through an aircraft having a rest area in accordance with FIG. 15.

Similarly, the arrangement shown in FIGS. 15 and 16 uses an aisle 40' offset toward one side of the aircraft, in this case the port side, accessible by an aft stairway 46'. The aisle 40' provides access to longitudinally extending bunks 42 at the port side, and a longitudinally extending bed 42 at the center of the starboard side, which is sandwiched between transversely extending beds 84. Beds 84 would have end access. At the forward portion of the rest area of FIGS. 15 and 16 a widened passing area 90 is provided, adjacent to a forward bed 92 which is approximately centered in the aircraft. As seen in FIG. 16, this arrangement will necessitate removing the overhead bins from one side of the center overhead storage area, and may provide too great an obstruction to longitudinally extending air conditioning ducts or other components to be practical for some aircraft. Nevertheless, as in all embodiments of the invention, seating in the main passenger cabin 14 or cargo/baggage capability in the lower lobe is minimally affected, so that the revenue generating capability of the aircraft is maximized, while still providing a convenient and comfortable rest area for attendants and pilots.

The arrangement shown in FIG. 17 illustrates the applicability to a larger aircraft of ovoid cross-section. Overhead attendant rest space 36 has adequate headroom for the long narrow aisleway 40 in the crown so that the stowbins 26 are retained in their original positions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A passenger transport aircraft having a fuselage including a main passenger cabin with a seating area for accommodating seated passengers, the main passenger cabin having a stowage bin structure spaced above the seating area and directly accessible to passengers in the main passenger cabin for carry-on articles, characterized by an overhead rest area with access from the main passenger cabin and located above the passenger seating area, the overhead rest area including an aisle having a floor and incorporated into the stowage bin structure and a plurality of rest units accessible from the aisle.

2. The aircraft defined in claim 1, in which the seating area of the main passenger cabin includes two outboard seat groups and a center seat group, each of the outboard seat groups being separated from the center seat group by an aisle in the main passenger cabin, the stowage bin structure including a central portion spaced above the center seat group, the aisle of the overhead rest area being incorporated into the central portion of the stowage bin structure, and the stowage bin structure including at least one stow bin accessible from the main passenger cabin and disposed alongside the lower portion of the aisle of the overhead rest area.

3. The aircraft defined in claim 1, in which the aisle of the overhead rest area extends longitudinally of the aircraft.

4. The aircraft defined in claim 3, in which the aisle of the overhead rest area extends approximately centrally of the aircraft.

5. The aircraft defined in claim 1, in which the rest units include a plurality of beds raised above the floor of the aisle of the overhead rest area and extending end-to-end longitudinally of the aircraft.

6. The aircraft defined in claim 1, in which the rest units include a plurality of beds extending longitudinally of the aircraft at opposite sides of the aisle of the overhead rest area.

7. The aircraft defined in claim 1, in which the stowage bin structure includes stow bins at opposite sides of the lower portion of the aisle of the overhead rest area, the stow bins being accessible to passengers in the seating area of the main passenger cabin.

8. The aircraft defined in claim 1, in which the rest units include beds raised above the floor of the aisle of the overhead rest area.

9. The aircraft defined in claim 1, in which the stowage bin structure is lowered into the seating area to provide increased headroom for the aisle of the overhead rest area.

10. The aircraft defined in claim 1, in which the aisle of the overhead rest area extends longitudinally of the aircraft for the major portion of the length of the aisle, and including a cross aisle intersecting the longitudinally extending aisle, and a plurality of resting units adjacent to the cross aisle.

11. The aircraft defined in claim 10, in which the resting units adjacent to the cross aisle include a plurality of beds having end access thereto.

12. The aircraft defined in claim 1, in which the overhead rest area extends longitudinally of the aircraft, and including a permanent access unit at one end of the rest area.

13. The aircraft defined in claim 12, in which the access unit is a stairway located in the aft portion of the aircraft, aftward of the seating area of the main passenger cabin.

14. The aircraft defined in claim 1, in which the resting units include beds extending longitudinally at opposite sides of the aisle of the overhead rest area, and an additional bed approximately aligned with the aisle of the overhead rest area.

15. The aircraft defined in claim 14, including a storage unit adjacent to and accessible from the additional bed, the storage unit being spaced above the seating area of the main passenger cabin.

16. The aircraft defined in claim 1, in which the aisle extends longitudinally of the aircraft, offset from the centerline thereof, and the rest units include a plurality of beds extending longitudinally along one side of the aisle of the overhead rest area.

17. The aircraft defined in claim 16, in which the rest units include additional beds located forward of the longitudinally extending beds, one of said additional beds being approximately aligned with the aisle of the overhead rest area.

18. The aircraft defined in claim 16, in which the stowage bin structure includes stow bins accessible from the main passenger cabin and located along only one side of the lower portion of the aisle of the overhead rest area.

19. The aircraft defined in claim 1, in which the rest units include beds extending transversely of the aircraft and having end access from the aisle of the overhead rest area.

20. The aircraft defined in claim 1, in which the rest units include beds extending longitudinally of the aircraft and having side access from the aisle of the overhead rest area, and beds extending transversely of the aircraft and having end access from the aisle of the overhead rest area.

21. The aircraft defined in claim 1, in which the main passenger cabin has a floor, the overhead rest area being entirely spaced above the floor of the main passenger cabin, including the area between the floor of the main passenger cabin and the aisle of the overhead rest area, leaving an open and unobstructed seating area from one side of the aircraft to the other underneath the overhead rest area.

22. A passenger transport aircraft having a fuselage including a main passenger cabin with a seating area for accommodating seated passengers, the main passenger cabin having a stowage bin structure spaced above the seating area and directly accessible to passengers in the main seating area for carry-on articles, characterized by an overhead rest area with access from the main passenger cabin and located above the passenger seating area, the overhead rest area including an aisle incorporated into the stowage bin structure and a plurality of rest units accessible from the aisle, the rest units being provided in modules, at least one of the modules including a lowered central portion forming the aisle of the overhead rest area and beds raised relative to the floor of the aisle and disposed at opposite sides thereof.

23. The aircraft defined in claim 22, in which the beds extend longitudinally of the aisle of the overhead rest area.

24. A passenger transport aircraft having a fuselage including a main passenger cabin with a seating area for accommodating seated passengers, the main passenger cabin having a stowage bin structure spaced above the seating area and directly accessible to passengers in the main seating area for carry-on articles, characterized by an overhead rest area with access from the main passenger cabin and located above the passenger seating area the overhead rest area including an aisle incorporated into the stowage bin structure and a plurality of rest units accessible from the aisle, the aisle of the overhead rest area including a long, narrow portion extending longitudinally of the aircraft for the majority of its length and a passing area of increased width.

25. A passenger transport aircraft having a fuselage including a main passenger cabin with a seating area for accommodating seated passengers, the main passenger cabin having a stowage bin structure spaced above the seating area and directly accessible to passengers in the main seating area for carry-on articles, characterized by an overhead rest area with access from the main passenger cabin and located above the passenger seating area, the overhead rest area including an aisle incorporated into the stowage bin structure and a plurality of rest units accessible from the aisle, the rest units including beds at opposite sides of the aisle of the overhead rest area, and a lounge module with a floor area connected to the aisle and of increased width as compared to the width of the aisle of the rest area.

26. The aircraft defined in claim 25, in which the rest units include a plurality of beds extending longitudinally along each side of the aisle of the overhead rest area, the lounge unit being located intermediate the ends of the overhead rest area with beds located both forward and aftward therefrom.

27. A passenger transport aircraft having a fuselage including a main passenger cabin with a seating area for accommodating seated passengers, the main passenger cabin having a stowage bin structure spaced above the seating area and directly accessible to passengers in the main seating area for carry-on articles, characterized by an overhead rest area with access from the main passenger cabin and located above the passenger seating area, the overhead rest area including an aisle incorporated into the stowage bin structure and a plurality of rest units accessible from the aisle, the fuselage including a peripheral frame, the overhead rest area being supported from the upper portion of the frame, and the stowage bin structure being supported from the overhead rest area.

28. The aircraft defined in claim 27, in which the overhead rest area is supported at least in part by vertically extending tie members.

29. The aircraft defined in claim 27, in which the overhead rest area is supported at least in part by tie members extending outward and upward from the overhead rest area to the peripheral frame.

* * * * *

UNITED STATES PATENT AND TRADEMARK OFFICE
CERTIFICATE OF CORRECTION

PATENT NO. : 6,073,883
DATED : June 13, 2000
INVENTOR(S) : K.G. Ohlmann et al.

It is certified that error appears in the above-identified patent and that said Letters Patent is hereby corrected as shown below:

Title page, columns 1-2,
Item [56] References Cited, insert the following references in appropriate numerical order:

| | | |
|---|---|---|
| -- 2,092,655 | 9/1937 | Page, Jr. |
| 2,124,003 | 7/1938 | McDonnell, Jr. et al. |
| 2,280,065 | 4/1942 | De Roode |
| 2,310,573 | 2/1943 | Burton |
| 3,898,704 | 8/1975 | Gallaher et al. |
| 4,071,210 | 1/1978 | Mutke |
| 4,397,432 | 8/1983 | Resetar |
| 4,458,864 | 7/1984 | Colombo et al. |
| 4,589,612 | 5/1986 | Halim |
| 4,594,817 | 6/1986 | McLaren et al. |
| 4,686,908 | 8/1987 | Legrand |
| 4,745,643 | 5/1988 | Clarke |
| 4,925,132 | 5/1990 | Zider |
| 5,314,143 | 5/1994 | Luria |
| 5,425,516 | 6/1995 | Daines |
| 5,383,629 | 1/1995 | Morgan |
| 4,022,404 | 5/1977 | Greiss |
| 4,055,317 | 10/1977 | Greiss |
| 4,066,227 | 1/1978 | Buchsel |
| 4,726,550 | 2/1988 | Chen et al. |
| 5,106,036 | 4/1992 | Sepstrup |
| 5,115,999 | 5/1992 | Buchsel et al. |
| 5,129,597 | 7/1992 | Manthey et al. |
| 5,205,515 | 4/1993 | Luria |
| 5,400,985 | 3/1995 | Banks |
| 4,413,292 | 5/1995 | Luria |
| 5,441,218 | 8/1995 | Mueller et al. |
| 5,474,260 | 12/1995 | Schwertfeger et al. |
| 5,526,999 | 6/1996 | Meston |
| 5,687,929 | 11/1997 | Hart et al. -- |

UNITED STATES PATENT AND TRADEMARK OFFICE
CERTIFICATE OF CORRECTION

PATENT NO. : 6,073,883
DATED : June 13, 2000
INVENTOR(S) : K.G. Ohlmann et al.

It is certified that error appears in the above-identified patent and that said Letters Patent is hereby corrected as shown below:

Item [56] References Cited Foreign Patents, insert the following references in appropriate order:

| | | |
|---|---|---|
| -- 0 035 955 | 2/1981 | WIPO |
| 1,002,271 | 3/1952 | France --. |

Column 2,
Item [56] Referenes Cited Other References, after "FOREIGN PATENT DOCUMENTS" insert the following:
-- OTHER REFERENCES
Flight Structures Inc., "747 Door 4 Overhead Crew Rest," publication date unknown.
The Boeing Company, "747-400 Overhead Crew Rest, Door 5," publication date unknown.
McDonnell Douglas, "Skybunk," publication date unknown.
*Air Transport World*, 11/95, p.39.
Schulz et al., "Lower Deck/Module for Flexible Alternative Use of the Lower Deck of a Jumbo Jet," publication date unknown.
Bruce Smith, "Douglas Plans Shorter, Double-Deck MD-12," *Aviation Week*, April 1992.

Signed and Sealed this

Thirtieth Day of October, 2001

Attest:

*Attesting Officer*

NICHOLAS P. GODICI
*Acting Director of the United States Patent and Trademark Office*